US009740775B2

(12) United States Patent
Wang et al.

(10) Patent No.: US 9,740,775 B2
(45) Date of Patent: Aug. 22, 2017

(54) VIDEO RETRIEVAL BASED ON OPTIMIZED SELECTED FINGERPRINTS

(71) Applicant: TCL RESEARCH AMERICA INC., San Jose, CA (US)

(72) Inventors: Haohong Wang, San Jose, CA (US); Yimin Yang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 294 days.

(21) Appl. No.: 14/656,979

(22) Filed: Mar. 13, 2015

(65) Prior Publication Data
US 2016/0267178 A1 Sep. 15, 2016

(51) Int. Cl.
G06F 17/30 (2006.01)
G06K 9/00 (2006.01)

(52) U.S. Cl.
CPC .. *G06F 17/30784* (2013.01); *G06F 17/30858* (2013.01); *G06K 9/00744* (2013.01); *G06K 9/00758* (2013.01)

(58) Field of Classification Search
CPC ......... G06F 17/30784; G06F 17/30858; G06F 17/30825; G06K 9/00744; G06K 9/00758
See application file for complete search history.

(56) References Cited

U.S. PATENT DOCUMENTS

| 8,335,786 B2 * | 12/2012 | Pereira | G06F 17/30784 707/728 |
| 8,805,827 B2 * | 8/2014 | Bhagavathy | G06F 17/30784 707/706 |
| 2005/0141707 A1 * | 6/2005 | Haitsma | G06F 17/3002 380/201 |

OTHER PUBLICATIONS

Ms.R.Gnana Rubini, Prof.P.Tamije Selvy, Ms.P.Anantha Prabha "Inverted File Based Search Technique for Video Copy Retrieval" International Journal on Computational Sciences & Applications (IJCSA) Vo2, No. 1, Feb. 2012.

* cited by examiner

*Primary Examiner* — Jorge A Casanova
(74) *Attorney, Agent, or Firm* — Anova Law Group, PLLC

(57) ABSTRACT

A video retrieval method is provided. The method includes dividing video sequences stored in a video database into a plurality of video frames, extracting by a predetermined feature extracting algorithm a plurality of selected fingerprints from the plurality of video frames representing features having characteristic information specific to the plurality of video frames, and storing the plurality of extracted selected fingerprints in a fingerprint database. The method also includes receiving a query video sequence submitted by a user, extracting by the predetermined feature extracting algorithm at least one query fingerprint representing at least one query frame from the received query video sequence, and calculating similarity between the query fingerprint and the selected fingerprints from the fingerprint database to search for a match for the query fingerprint. Further, the method includes determining a matching fingerprint in the selected fingerprints by applying a fast dynamic programming algorithm and generating a matching result.

14 Claims, 7 Drawing Sheets

VIDEO RETRIEVAL BASED ON OPTIMIZED SELECTED FINGERPRINTS

FIELD OF THE INVENTION

The present invention relates generally to the field of computer technologies and, more particularly, to techniques for video retrieval.

BACKGROUND

The rapid development of the Internet and digital technologies in the past years has increased availability of video content. Video retrieval techniques have been quite popular in today's commercial and entertainment businesses. Traditional video retrieval methods are mostly based on sequential matching strategy derived from signal processing domain. Those approaches mainly focus on exploring new features and distance/similarity measurement functions while neglecting the searching efficiency to some extent. Although some video retrieval techniques provide a compact video content representation for efficient retrieval, a fingerprint database is tremendously large considering the size of vast video archives. There are some attempts to speed up a linear search using techniques such as temporal pruning and coarser granularity searching, but a search process is still near to an exhaustive search. Therefore, proliferation of digital videos requires an efficient and robust method for managing and retrieving video contents.

The disclosed methods and systems are directed to solve one or more problems set forth above and other problems. For example, the disclosed methods and systems can provide technical solutions for improving searching efficiency and storage space of the fingerprint database in the current video retrieval system. For example, the disclosed methods can be applied to a detection system for copyright infringement (e.g., illegal re-encoded movies on the Internet, or movie extracts) that minimizes query errors subject to the storage constraint.

BRIEF SUMMARY OF THE DISCLOSURE

One aspect of the present disclosure includes a video retrieval method. The method includes dividing video sequences stored in a video database into a plurality of video frames, extracting by a predetermined feature extracting algorithm a plurality of selected fingerprints from the plurality of video frames representing features having characteristic information specific to the plurality of video frames, and storing the plurality of extracted selected fingerprints in a fingerprint database. The method also includes receiving a query video sequence submitted by a user, extracting by the predetermined feature extracting algorithm at least one query fingerprint representing at least one query frame from the received query video sequence, and calculating similarity between the query fingerprint and the selected fingerprints from the fingerprint database to search for a match for the query fingerprint. Further, the method includes determining a matching fingerprint in the selected fingerprints by applying a fast dynamic programming algorithm and generating a matching result.

Another aspect of the present disclosure includes a video retrieval system. The video retrieval system includes a video database configured to store video sequences and metadata of the video sequences and a video fingerprint extraction module configured to extract by a predetermined feature extracting algorithm a plurality of selected fingerprints from the plurality of video frames representing features having characteristic information specific to the plurality of video frames. The video retrieval system also includes a fingerprint database configured to store the plurality of extracted selected fingerprints and an inverted index generation module configured to, based on the fingerprints stored in the fingerprint database, build a plurality of indices to generate an inverted file indexing table of the fingerprints, where each of the plurality of fingerprint is divided into a plurality of words, and vertical and horizontal dimensions of the inverted file indexing table represent respectively possible values of a word and a position of the word in the fingerprint. Further, the video retrieval system includes a query video fingerprint extraction module configured to extract by the predetermined feature extracting algorithm at least one query fingerprint representing at least one query frame from the received query video sequence when a query video sequence is submitted by a user and a search module configured to calculate similarity between the query fingerprint and selected fingerprints, determine a matching fingerprint in the selected fingerprints by applying a fast dynamic programming algorithm, and generate a matching result to be presented to the user based on the matching fingerprint.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

The term "video fingerprinting" is a technique in which software identifies, extracts, and then compresses characteristic components of a video, enabling that video to be uniquely identified by its resultant "fingerprint". Such technique may include key frame analysis, color and motion changes sequential analysis, camera shot analysis, etc., and the analysis results may then be used as the fingerprints of the video sequence.

Figure 1:
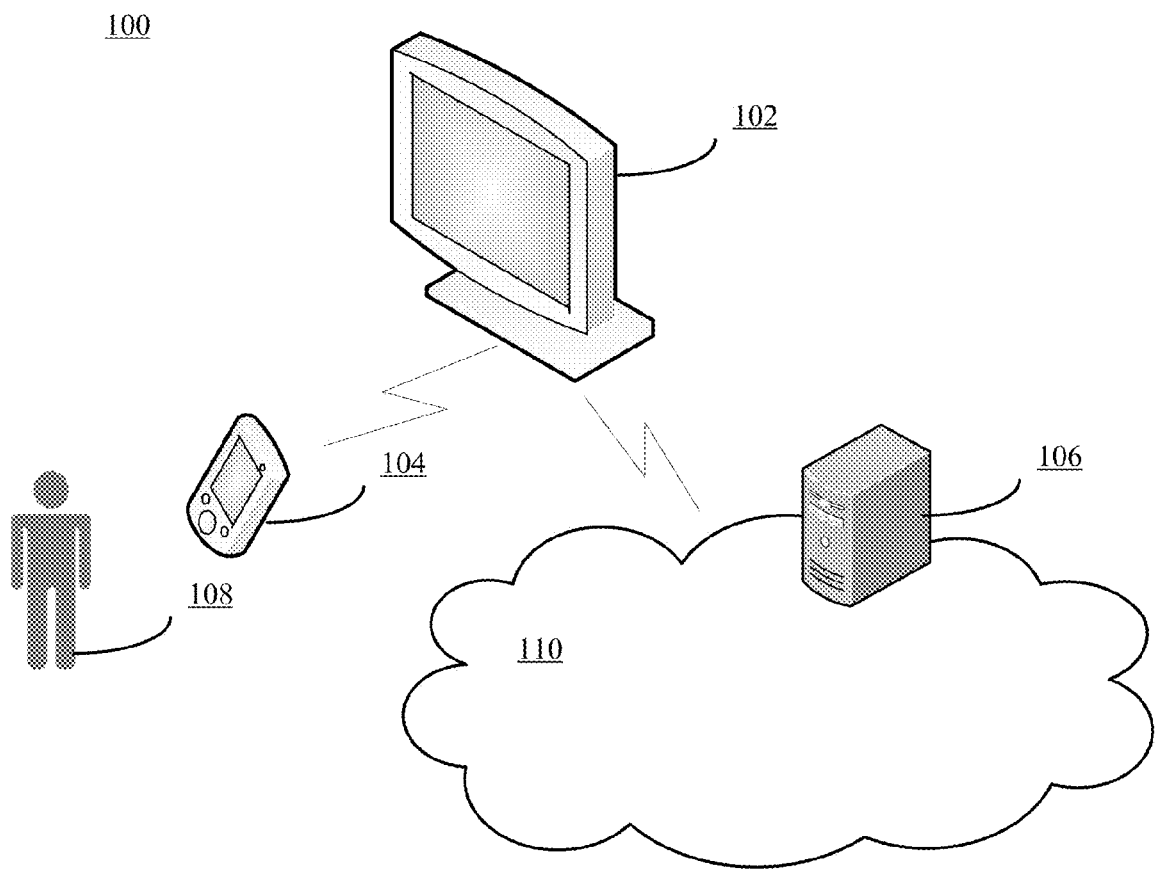
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a remote control 104, a server 106, a user 108, and a network 110. Other devices may also be included.

TV 102 may include any appropriate type of TV, such as plasma TV, LCD TV, projection TV, non-smart TV, or smart TV. TV 102 may also include other computing system, such as a personal computer (PC), a tablet or mobile computer, or a smartphone, etc. Further, TV 102 may be any appropriate content-presentation device capable of presenting multiple programs in one or more channels, which may be controlled through remote control 104.

Remote control 104 may include any appropriate type of remote control that communicates with and controls the TV 102, such as a customized TV remote control, a universal remote control, a tablet computer, a smartphone, or any other computing device capable of performing remote control functions. Remote control 104 may also include other types of devices, such as a motion-sensor based remote control, or a depth-camera enhanced remote control, as well as simple input/output devices such as keyboard, mouse, voice-activated input device, etc.

Further, the server 106 may include any appropriate type of server computer or a plurality of server computers for providing personalized contents to the user 108. The server 106 may also facilitate the communication, data storage, and data processing between the remote control 104 and the TV 102. TV 102, remote control 104, and server 106 may communicate with each other through one or more communication networks 110, such as cable network, phone network, and/or satellite network, etc.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Figure 2:
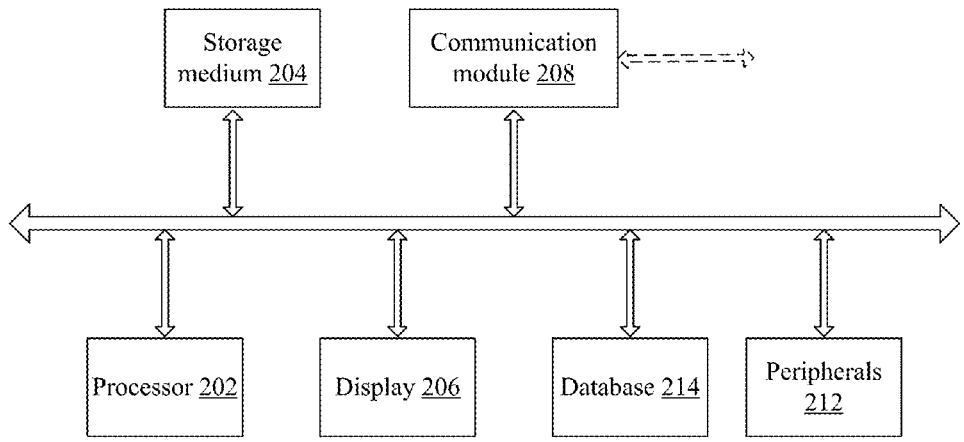
FIG. 2 illustrates an exemplary computing system consistent with the disclosed embodiments.

TV 102, remote control 104, and/or server 106 may be implemented on any appropriate computing circuitry platform. FIG. 2 shows a block diagram of an exemplary computing system capable of implementing TV 102, remote control 104, and/or server 106.

As shown in FIG. 2, the computing system 200 may include a processor 202, a storage medium 204, a display 206, a communication module 208, a database 214, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 214 may include one or more databases for storing certain data and for performing certain operations on the stored data, such as database searching.

Figure 3:
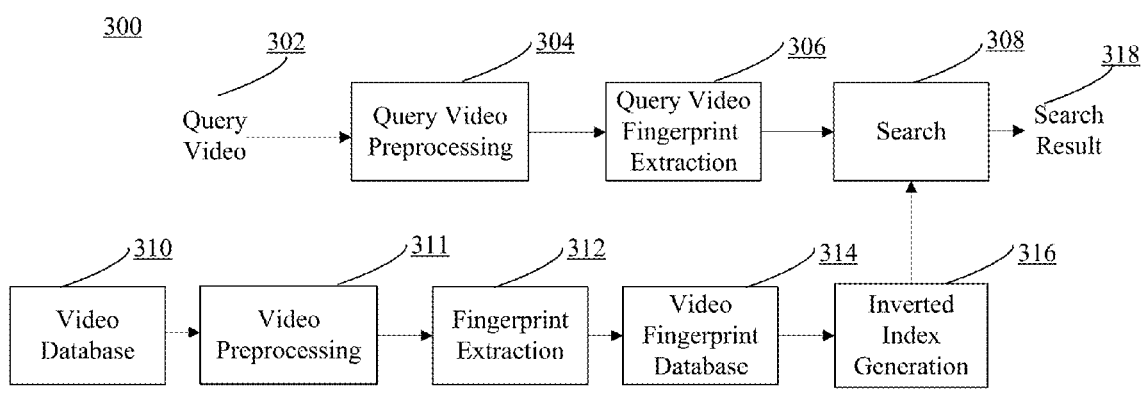
FIG. 3 illustrates an exemplary system for video retrieval consistent with the disclosed embodiments.

TV 102, remote control 104, and/or server 106 may implement a video retrieval system for user 108. FIG. 3 illustrates an exemplary video retrieval system 300 based on selected fingerprints and inverted-file indexing.

As shown in FIG. 3, the video retrieval system 300 includes a query video 302, a query video preprocessing module 304, a query video fingerprint extraction module 306, a search module 308, a video database 310, a video preprocessing module 311, a video fingerprint extraction module 312, a fingerprint database 314, an inverted index generation module 316 and a search result 318. Certain components may be omitted and other components may be added. The video retrieval system 300 (e.g., the various components) may be implemented in hardware, software, or a combination of hardware and software.

The query video 302 may include any appropriate type of source for video contents and may contain various video sources. The contents from the query video 302 may include both video data and metadata. A plurality of frames may be associated with the query video 302 and may be provided to other modules for processing.

The query video preprocessing module 304 may be configured to carry out video signal conversion, resampling and filtering of the query video. The query video preprocessing module 304 may divide each of video sequences in a video database into a plurality of video frames, adjust global contrast of an image through a histogram equalization operation and balance between image quality and global contrast level through image fusion. The query video preprocessing module 304 may reside within the TV 102 or outside the TV 102 depending on particular applications.

The query video fingerprint extraction module 306 may be configured to extract at least one fingerprint representing at least one query frame from the query video sequence when a query video sequence is submitted. For example, the video fingerprint extraction module 306 may use a predetermined feature extraction algorithm to extract a feature of the query frame representing the characteristic information of the query frame, either or both of video features and audio features may be used.

The search module 308 may be configured to calculate similarity between a query fingerprint and selected fingerprints (SFs) to search for a match for the query fingerprint from the fingerprint database 314, to determine a matching fingerprint in the SFs by applying a fast dynamic programming algorithm, and to generate a matching result to be presented to the user based on the matching fingerprint.

Further, the video database 310 may include any appropriate database to store video sequences and/or metadata of the video sequences.

The function of the video preprocessing module 311 is similar to the function of the query video preprocessing module 304. The video preprocessing module 311 may be configured to carry out video signal conversion, resampling and filtering of the video sequences stored in the video database 310.

The video fingerprint extraction module 312 may be configured to extract a plurality of selected fingerprints from the plurality of video frames representing features having characteristic information specific to the plurality of video frames. More specifically, the video fingerprint extraction module 312 uses the same predetermined feature extraction algorithm used by the query video fingerprint extraction module 306 to extract video fingerprints form the plurality of video frames.

The fingerprint database 314 may be configured to store the plurality of video fingerprints extracted from a large library of video sequences and corresponding metadata such as a video title.

The inverted index generation module 316 may be configured to build a plurality of indices to generate an inverted file indexing table of the SFs based on the fingerprints stored in the fingerprint database 314. Specifically, a fingerprint is divided into h words, where h is an integer. The vertical and horizontal dimensions of the table represent the possible values of a word and a position of a word in a fingerprint, respectively. If the word length for each word is w, then there are $2^w$ possible values, obtaining a table with size of $(2^w \cdot h)$. For each entry of the table, a list of fingerprint indices is stored. Those fingerprints share the same value at the corresponding word position.

Figure 4:
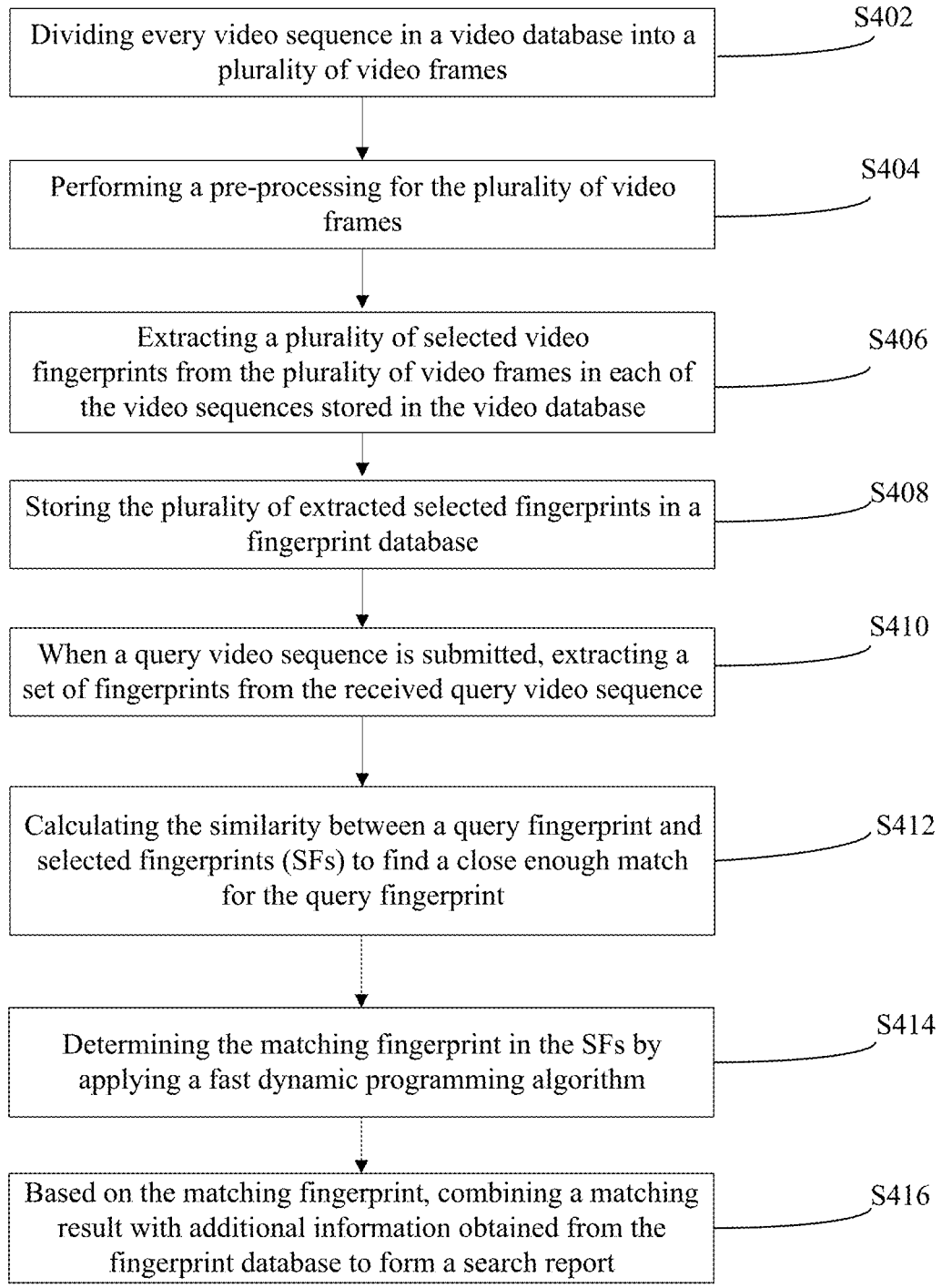
FIG. 4 illustrates a flow chart of an exemplary process performed by various modules in a system for video retrieval consistent with the disclosed embodiments.

The search result 318 may be outputted by the search module 308. That is, based on information obtained from the query video extraction module 306 and the inverted index generation module 316, the search module 308 may find a close enough match for extracted fingerprints within the fingerprint database 314 to generate the search result 318. FIG. 4 illustrates a flow chart of an exemplary process performed by various modules in a video retrieval system consistent with the disclosed embodiments.

As shown in FIG. 4, at the beginning, every video sequence in a video database is divided into a plurality of video frames (S402). Because a video is a sequence of frames and the changes between consecutive frames are relatively small due to typical frame rate for a video (e.g. 25 frames/second), instead of dealing with each frame individually, some grouping or clustering techniques may be applied to separate the whole video into different sets of frames with each set has similar frames for further processing.

Figure 5:
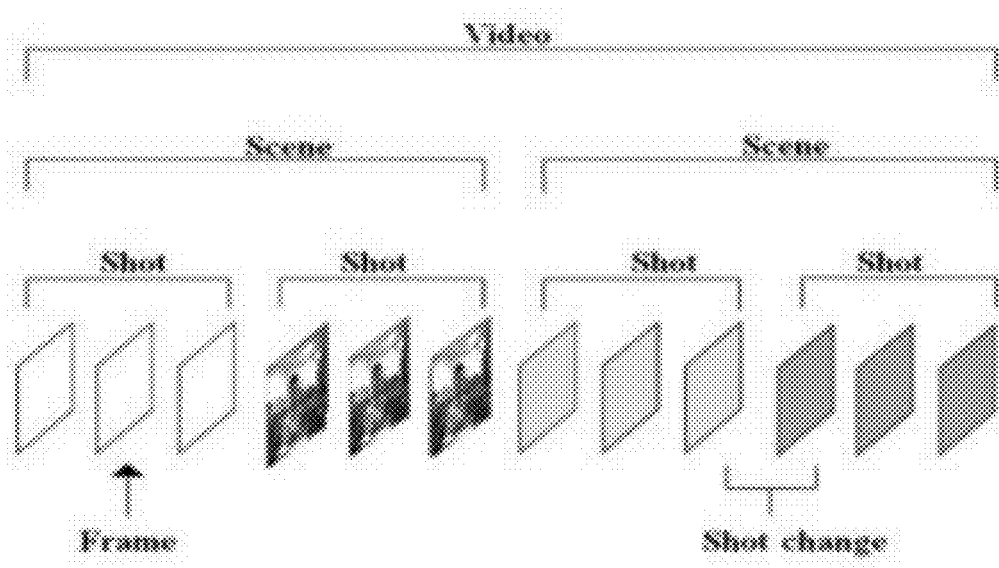
FIG. 5 illustrates a video sequence being divided into different video components consistent with the disclosed embodiments.

For example, FIG. 5 illustrates a video stream being divided into different video components. As shown in FIG. 5, a video stream may be divided into scenes; a scene may be divided into shots; and a shot may be divided into frames, etc. The frame can be further divided into objects, and features of the video frame may be extracted for further processing.

Returning to FIG. 4, a pre-processing is performed for the plurality of video frames (S404). The pre-processing may include performing histogram equalization and carrying out image fusion. The purpose of equalization is to adjust the global contrast of an image for enhancing bone structure in the image and revealing more details. The image fusion may balance between the image quality and global contrast level.

A plurality of selected video fingerprints are extracted from the plurality of video frames in each of the video sequences stored in the video database (S406). The video fingerprint can be feature information designed to uniquely identify video signals. Generally, each video fingerprint corresponds to a certain segment of video. Then, the plurality of extracted selected fingerprints can be stored in a fingerprint database (S408). The fingerprint database may be implemented in the form of a search tree, or other appropriate data structures. The plurality of video fingerprints extracted from a large library of video sequences and corresponding metadata such as a video title may be stored in the fingerprint database.

When a query video sequence is submitted, a set of fingerprints may be extracted from the received query video sequence (S410). The submitted query video may include any appropriate type of source for video contents and may contain various video sources. The contents from the query video may include both video data and metadata. A plurality of frames may be associated with the submitted query video and may be provided for fingerprint extraction. The fingerprint determines if the query video and the video sequences stored in the video database are the same, even if those videos have been encoded with different codecs and at different bit rates, and as a result differ significantly. Assuming that $F=\{f_i|0 \leq i \leq n-1\}$ denotes the set of fingerprints for the query video sequence, where n is a total number of frames in the query video sequence. In other words, each frame in the video sequence is represented by one fingerprint. Let $X=\{f_{x_l}|x_0 < x_1 < \ldots < x_{m-1}, 0 \leq l \leq m-1, m \leq n\}$ be the selected fingerprints (SFs), where $x_l$ is an index of the SF in an original video sequence, and m is a total number of SFs. An optimal set of SFs is an abbreviated representation of the original video sequence.

The similarity between a query fingerprint and the SFs may be calculated to find a close enough match for the query fingerprint (S412). A query is defined by:

$$q(f_i, X) = \begin{cases} x_O & x_O = \mathrm{argmax}_{x_l}\{sim(f_i, f_{x_l}) \mid f_{x_l} \in X\}, \text{ and } sim(f_i, f_{x_O}) \geq TH_s \\ -1 & \text{otherwise} \end{cases} \quad (1)$$

where sim(•) is a similarity function with a real number between 0 and 1, and $TH_s$ is a preset threshold. The query may return −1 if the similarity between the query fingerprint and the matching SF is below $TH_s$. That is, the input of the query is any fingerprint in the original query video sequence (i.e., $f_i \in F$), and the output of the query is the location of the matching SF, denoted by $x_O$.

Figure 6:
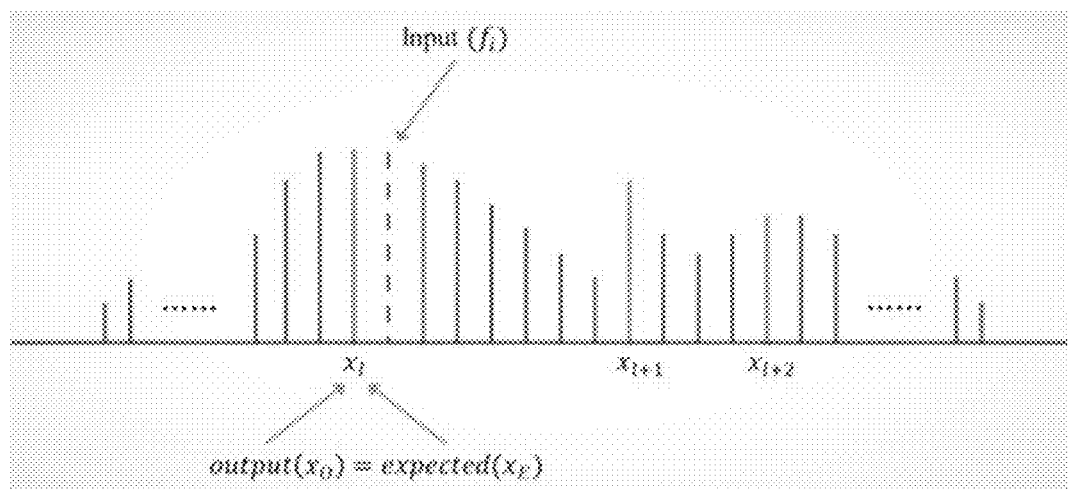
FIG. 6 illustrates an exemplary query result meeting expectation consistent with the disclosed embodiments.

In this disclosure, the similarity between two fingerprints is used as a measurement to determine how close these two fingerprints are. It should be noted that two identical fingerprints have a maximum similarity value while two visually different fingerprints have a low similarity value. Based on the definition in Equation (1), the query is the process of finding the matching fingerprint in SFs (i.e., X) for the query fingerprint. FIG. 6 illustrates an exemplary query result meeting expectation consistent with the disclosed embodiments.

Figure 7:
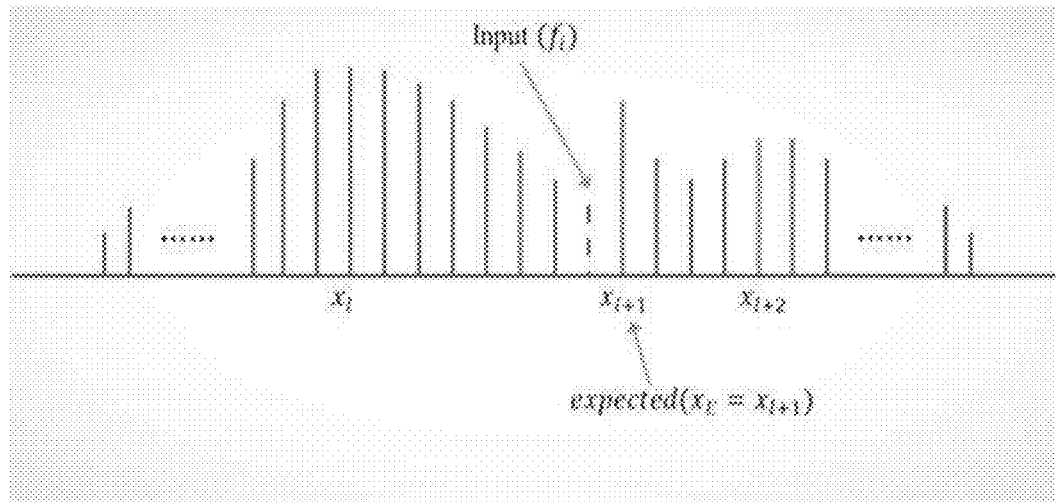
FIG. 7 (a) and FIG. 7 (b) illustrate two types of query error cases consistent with the disclosed embodiments.
Figure 7:
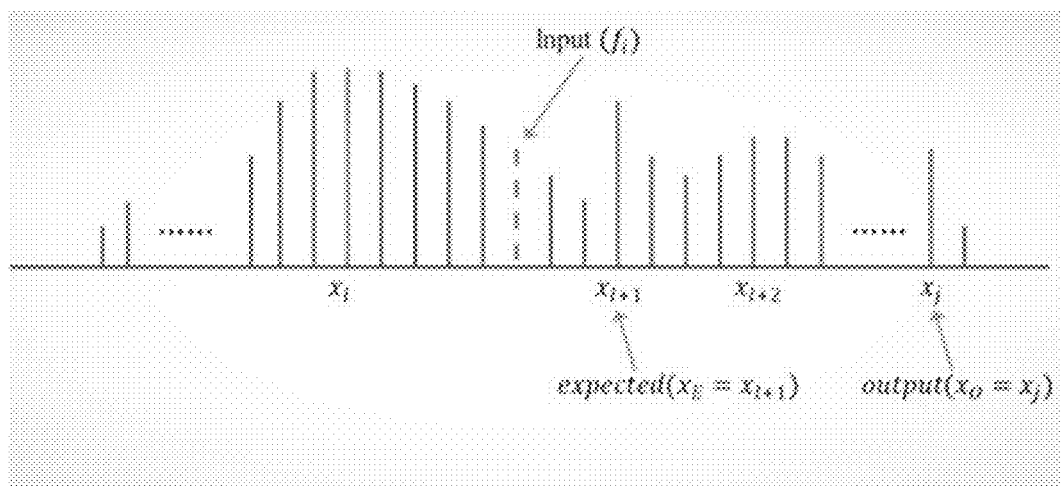

As shown in FIG. 6, $f_{x_l}$, $f_{x_{l+1}}$, and $f_{x_{l+2}}$ are three consecutive SFs. Given a query $f_i$, if an output is equal to $x_l$, then a query result meets expectation, denoted by $x_E$; otherwise, a query error occurs. In other words, the expected result of the query is the closest (in the sense of location) SF (with a largest similarity). If all fingerprints of the original video sequence are chosen as SFs, a query should always return an expected result assuming no two fingerprints are identical. This assumption holds for most video sequences. However, a limited number of SFs are used to approximate the original full fingerprint set (out of query efficiency and storage purposes etc.), thus a query may generate the error due to the approximation. The query error is caused by an unexpected result, meaning that the output in Equation (1) is not the location of the closest SF to the input query fingerprint. FIG. 7 (a) and FIG. 7 (b) illustrate two types of query error cases consistent with the disclosed embodiments.

As shown in FIG. 7 (a) and FIG. 7 (b), $f_{x_l}$, $f_{x_{l+1}}$, and $f_{x_{l+2}}$ are three consecutive SFs. The output of such query can be categorized into the following two cases: (I) the output is −1, which indicates none of the SFs meets the minimum similarity requirement ($TH_s$). In other words, $q(f_i, X)=-1$, $sim(f_i, f_{x_l}) < TH_s$, $\forall f_{x_l} \in X$ is illustrated in FIG. 7 (a); (II) the output is not the expected fingerprint location ($x_E$), but some other SFs have a larger similarity for the query fingerprint than the closest one. In other words, $x_O \neq x_j$, $sim(f_i, f_{x_E}) \geq TH_s$, $sim(f_i, f_{x_E}) < sim(f_i, f_{x_O})$ is illustrated in FIG. 7 (b).

The two types of query errors are analyzed from similarity point of view. If the similarity between the query fingerprint and its closest SF is lower than the preset threshold $TH_s$, the output can never be the location of the expected fingerprint ($x_E$), and it can cause query error case I as shown in FIG. 7 (a). Therefore, this type of query error shown in FIG. 7 (a) is represented by:

$$\varphi(f_i, f_{x_E}) = \begin{cases} 1 & sim(f_i, f_{x_E}) < TH_s \\ 0 & \text{otherwise} \end{cases} \quad (2)$$

On the other hand, even if the similarity between the query fingerprint and its closest SF is equal to or is larger than the preset threshold $TH_s$, it may happen that a more similar SF exists beyond the expected location as shown in FIG. 7 (b). This type of query error shown in FIG. 7 (b) is represented by:

$$\xi(f_i, f_{x_E}) = \qquad (3)$$
$$\begin{cases} 1 & sim(f_i, f_{x_E}) \geq TH_s, \exists f_{x_j} \in X, sim(f_i, f_{x_E}) < sim(f_i, f_{x_j}) \\ 0 & \text{otherwise} \end{cases}.$$

Therefore, two types of query errors indicated in Equation (2) and Equation (3) can cover and only cover the query defined in Equation (1). Therefore, the query error can be denoted by:

$$D(f_i, X) = \varphi(f_i, f_{x_E}) + \xi(f_i, f_{x_E}). \quad (4)$$

Figure 8:
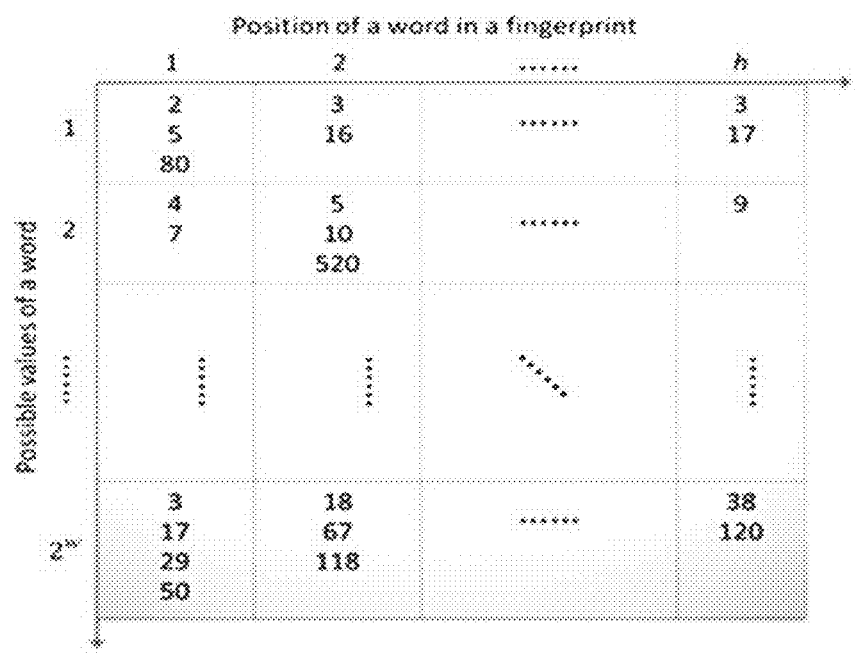
FIG. 8 illustrates an exemplary inverted file indexing table consistent with the disclosed embodiments.

The scale of the video database increases explosively even with SFs, which imposes a big challenge on efficient search especially for real-time applications. Therefore, an inverted file indexing scheme is presented for video retrieval. That is, based on the fingerprints stored in the fingerprint database, a plurality of indices are built to generate an inverted file indexing table of the SFs. The inverted file is an index data structure storing a mapping from content, such as words or numbers, to its locations in a database file. The purpose of the inverted index is to allow fast full searches, at a cost of increased processing when a document is added to the database. FIG. 8 shows an exemplary inverted file indexing table.

As shown in FIG. 8, a fingerprint is divided into h words, where h is an integer. Vertical and horizontal dimensions of the inverted file indexing table represent respectively possible values of a word and a position of the word in a fingerprint. If the word length for each word is w, then there are $2^w$ possible values, obtaining the inverted file indexing table with size of ($2^w \cdot h$). For each entry of the inverted file indexing table, a list of fingerprint indices are stored. Those fingerprints share a same value at a corresponding word position.

There are many matching strategies based on the inverted file indexing table. As used herein, the fingerprint of the query video and the fingerprints stored in the fingerprint database are matched by using a voting-based matching approach.

Specifically, the number of matched words for each of the fingerprints that have at least one matched word with the query fingerprint are counted. Then, the best match is the one with the most number of matched words (votes). If multiple fingerprints have the same number of the matched words, then a linear search is performed to find the one with a largest similarity value. Based on experimental results, the voting-based search method achieves a balance between query time and query accuracy. There are several properties for the inverted file indexing table: (1) in FIG. 8, each column contains $2^w$ cells, and any SF in the fingerprint database has a reference in one and only one of the $2^w$ cells; (2) any SF in the fingerprint database has h references in the inverted file indexing table, and one per column. Based on the above properties, the more words are generated, the more storage is needed to keep the inverted file indexing table, and the more time is required to perform the matching. To be specific, total space for storing the inverted index table is defined by:

$$S(f_i, X) = c \cdot h \cdot m = \Sigma_{i=0}^{m-1} C, \quad (5)$$

where m is a total number of SFs in the fingerprint database; c is a constant factor; and $C = c \cdot h$ is a constant number representing the space required to keep exactly one reference of a fingerprint. As shown from Equation (5) that the storage is a function of m, it means that the storage is determined by the total number of SFs (to simply the analysis, it is assumed that h is given). In other words, the storage is independent of the input query ($f_i$).

The problem is to find an optimal set of SFs that can minimize the query error subject to the storage constraint. Since an operation of one single query is a random variable, the behavior is hard to characterize. Instead, the total query error (i.e., accumulation of single query error) over the original video fingerprint sequence is used to statistically represent the general performance of the query process. Therefore, the optimization problem to be solved is defined by:

$$\text{Minimize } \Sigma_{i=0}^{n-1} D(f_i, X) \; s.t.: S(f_i, X) \leq S_{max}, \quad (6)$$

where $S_{max}$ is a maximum storage that is allowed.

The more SFs are selected, the less chance a query falls into error case I (as shown in FIG. 7 (a)). However, the probability of generating error case II (as shown in FIG. 7 (b)) probably increases. In other words, the number of SFs has either "positive" or "negative" effect on the total query error. On the other hand, the size of SFs (i.e., m) needs to be kept as small as possible, since the size of SFs (i.e., m) affects the storage requirement as shown in Equation (5). Therefore, the problem in Equation (6) can be interpreted as to find the most appropriate set of SFs to minimize the total query error.

Given N and m being a total number of fingerprints in an original sequence and the number of SFs to be chosen, there are approximately $$\binom{n}{m} = \frac{n!}{(n-m)!m!}$$

possible solutions for a specific m. Assuming m as a variable, a total number of solutions to be evaluated is $$\Sigma_{l=1}^{m} \frac{n!}{(n-l)!l!}.$$

When n and m are large, it is infeasible to perform an exhaustive search over all the solutions. Actually, the fingerprint selection problem is much like the 0-1 knapsack problem, which is known to be NP-hard. Therefore, a fast approach that can help find the optimal solution needs to be provided.

The calculation of $\phi(f_i, f_{x_E})$ only involves its most recent SF. However, $\xi(f_i, f_{x_E})$ can be determined by evaluating all available SFs. If the probability of $\xi(f_i, f_{x_E})$ can be modeled, then there is no need to compare with each of the SFs.

Specifically, pair-wise similarities for each pair of fingerprints in F may be computed. For each query input $f_i$, there is a ranked list of fingerprints with decreasing similarities. Given a preset similarity threshold $TH_s$, a list of fingerprints that has a similarity value larger than or equal to $TH_s$ with the input fingerprint $f_i$ can be obtained, and the list of fingerprints is denoted by $\mathcal{G}_i$. Assuming that the selection of each SF is a Bernoulli trial with each fingerprint in F having equal probability of being selected or not, then the error $\xi(f_i, f_{x_E})$ is approximated as the probability equal to $$\frac{|\mathcal{G}_i|-1}{|F|}.$$

The Bernoulli trial is a random experiment with exactly two possible outcomes, "success" and "failure", in which the probability of success is the same every time the experiment is conducted. Therefore, Equation (3) is re-written as:

$$\xi(f_i, f_{x_E}) = \frac{|\mathcal{G}_i|-1}{|F|}, \mathcal{G}_i = \{f_p \mid sim(f_i, f_p) \geq TH_s, \forall f_p \in F\} \quad (7)$$

After error approximation, the optimization problem can be converted into a graph theory problem of finding a single-source shortest path problem in a Directed Acyclic Graph (DAG), where all nodes are topologically ordered with each node representing one fingerprint in the original video fingerprint sequence. The matching fingerprint in the SFs can be determined by applying a fast dynamic programming algorithm (S414). A critical part in this equation involves the definition of a weight function $e(\cdot)$. Based on the definition of the two types of errors in the query error analysis, the weight function is calculated as:

$$e(f_j, f_k) = \Sigma_{i=j}^{k}(\phi(f_i, f_{x_E}) + \xi(f_i, f_{x_E})), \quad (8)$$

where $f_j$ and $f_k$ are any two fingerprints in F, and the expected fingerprint location is determined by:

$$x_E = \begin{cases} j & i \leq \frac{k-j}{2} \\ k & i > \frac{k-j}{2} \end{cases}. \quad (9)$$

It is worth noting that $e(f_j, f_k)=0$ if $k\cdot j=1$, which means $f_j$ and $f_k$ are two consecutive fingerprints.

The goal is to find the optimal SFs, $X^* = \{f_{x_0}^*, f_{x_1}^*, \ldots, f_{x_{m-1}}^*\}$ to minimize the overall query error. Let $O_l[f_{x_l}]$ denote the query error based on the optimal selection of the first l SFs, where $f_{x_l}$ is the last selected SF. Assuming that the first frame ($f_0$) is always selected as an SF, then $O_0[f_0]$ is defined by:

$$O_0[f_0] = \Sigma_{i=1}^{n-1}(\phi(f_i, f_0) + \xi(f_i, f_0)). \quad (10)$$

On the other hand, $O_l[f_{x_l}]$ is defined by:

$$O_l[f_{x_l}] = O_{l-1}[f_{x_{l-1}}] + e(f_{x_{l-1}}, f_{x_l}) = \quad (11)$$
$$O_{l-1}[f_{x_{l-1}}] + \Sigma_{i=x_{l-1}}^{x_l}(\phi(f_i, f_{x_E}) + \xi(f_i, f_{x_E})).$$

Equation (11) shows that the selection of the lth SF is independent from the selection of the previous l-1 SFs.

Once each $O_l$ is computed, the optimal solution to the whole problem can be obtained by taking $$f_{x_{m-1}}^* = \operatorname{argmin}_{f_{x_{m-1}}} O_{m-1}[f_{x_{m-1}}], \quad (12)$$

and backtracking in order of decreasing l until the base case is satisfied. In other words, $$f_{x_{l-1}}^* = \operatorname{argmin}_{f_{x_{l-1}}} \{O_{l-1}[f_{x_{l-1}}] + e(f_{x_{l-1}}, f_{x_l}^*)\}. \quad (13)$$

It is worth noting that the error function to be optimized is non-increasing with m. Therefore, the solution to the optimization problem in Equation (6) is to find the maximum integer m that satisfies the storage constraint $S_{max}$.

Returning to FIG. 4, after the fast dynamic programming algorithm is applied, based on the matching fingerprint, the matching result is combined with additional information obtained from the fingerprint database to form a search report such that a user can perform a corresponding operation based on the search report, such as playing a matching video (S416). The search result may also be presented to the user in various display formats.

By formulating the video retrieval task into a query error minimization problem under certain constraint on storage, an optimal video fingerprint abstraction for efficient and effective retrieval can be obtained by utilizing the inverted indexing schema. The disclosed video retrieval methods and systems may trade off query accuracy and storage by taking into consideration of both fingerprints skimming and indexing.

Figure 9:
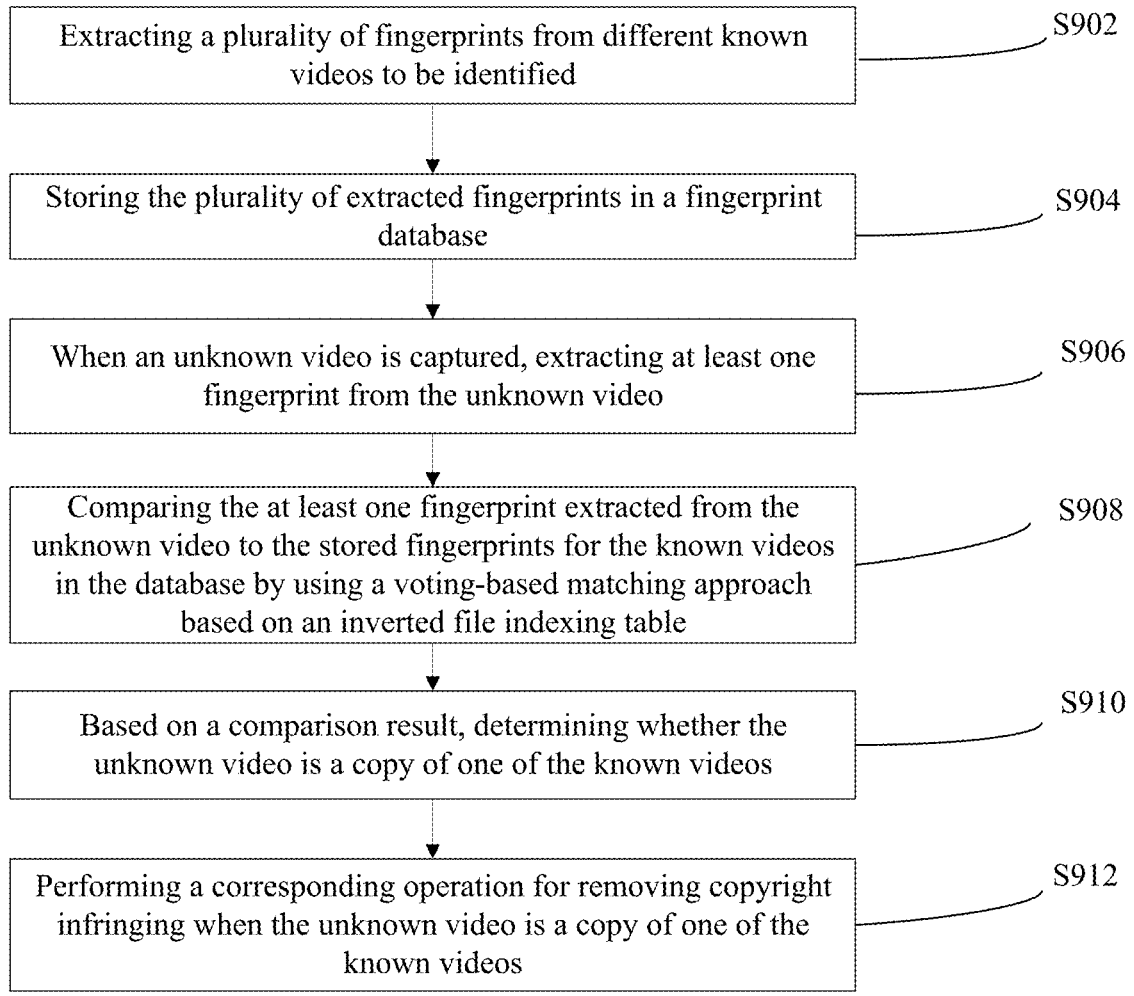
FIG. 9 illustrates an exemplary process for detecting and removing copyright infringing consistent with the disclosed embodiments.

It should be noted that, the concept for the video retrieval systems and methods can be extended to other services. For example, the disclosed video retrieval methods and systems may be integrated on smart TV systems and/or smart terminals to help organize and share produced information valuable to assist in detecting and removing copyright infringing, perceptually identical video content from the databases of such websites and prevent any future uploads made by users of these websites. FIG. 9 illustrates an exemplary process for detecting and removing copyright infringing consistent with the disclosed embodiments. The process for detecting and removing copyright infringing may be implemented in software or hardware.

As shown in FIG. 9, at the beginning, a plurality of video fingerprints may be extracted from different known videos to be identified (S902). The video fingerprint can be feature information designed to uniquely identify the known video signals. It should be noted that video fingerprint profiles of the known videos may also directly obtained from copyright holders because the copyright holders may already have analyzed the videos to develop a set of fingerprints. The plurality of extracted fingerprints may be stored in a fingerprint database (S904). Typically, the fingerprint database may store the extracted fingerprints for a range of different known videos. When an unknown video is captured, at least one fingerprint may be extracted from the unknown video (S906). The unknown video may be commercial spots, music videos, sport clips, news clips, and copyrighted works accessible through the Internet or downloadable to personal communication devices (e.g., smartphones, tablets, etc.). The at least one fingerprint extracted from the unknown video may be compared to the stored fingerprints for the known videos in the fingerprint database by using a voting-based matching approach based on an inverted file indexing table (S908). Based on a comparison result, whether the unknown video is a copy of one of the known videos is determined (S910). Two videos with the same or similar fingerprints are likely to be derived from the same source. If the unknown video is a copy of one of the known videos, a corresponding operation for removing copyright infringing is performed (S912).

For another example, television devices integrated with the video retrieval system can also automatically recognize the video content on-screen in order to enable interactive features and applications on top of the programming. Further, the video fingerprinting may also be used for broadcast monitoring (e.g., advertisement monitoring, news monitoring) and general media monitoring. Broadcast monitoring solutions can inform content providers and content owners with play lists of when and where their video content was used.

The disclosed systems and methods can also be extended to other devices with displays, such as smartphones, tablets, PCs, smartwatches, and so on, to perform video retrieval. Other steps may be referred to above descriptions with respect to the system for video retrieval. Other applications, advantages, alternations, modifications, or equivalents to the disclosed embodiments are obvious to those skilled in the art.

What is claimed is:

1. A video retrieval method, comprising:
dividing video sequences stored in a video database into a plurality of video frames;
extracting by a predetermined feature extracting algorithm a plurality of selected fingerprints from the plurality of video frames representing features having characteristic information specific to the plurality of video frames;
storing the plurality of extracted selected fingerprints in a fingerprint database;
receiving a query video sequence submitted by a user;
extracting by the predetermined feature extracting algorithm at least one query fingerprint representing at least one query frame from the received query video sequence;
calculating similarity between the query fingerprint and the selected fingerprints from the fingerprint database to search for a match for the query fingerprint;
determining a matching fingerprint in the selected fingerprints by applying a fast dynamic programming algorithm; and
based on the matching fingerprint, generating a matching result to be presented to the user, wherein determining a matching fingerprint in the selected fingerprints by applying a fast dynamic programming algorithm further includes:
analyzing a query error caused by using a limited number of the selected fingerprints to approximate an original fingerprint set;
based on the plurality of fingerprints stored in the fingerprint database, building indices to generate an inverted file indexing table of fingerprints, wherein each of the plurality of fingerprints is divided into a plurality of words, and vertical and horizontal dimensions of the inverted file indexing table represent respectively possible values of a word and a position of the word in the fingerprint;
based on the inverted file indexing table, matching the fingerprint of the query video with the fingerprints stored in the fingerprint database by using a voting-based matching approach; and
finding a desired set of the selected fingerprints that minimizes the query error subject to a storage constraint.

2. The method according to claim 1, wherein matching the fingerprint of the query video and the fingerprints stored in the fingerprint database by using a voting-based matching approach further includes:
counting a total number of matched words for each of the fingerprints that have at least one matched word with the query fingerprint;
identifying a matching fingerprint with a most number of matched words from the fingerprints as the matching fingerprint; and
when multiple fingerprints have a same number of the matched words, performing a linear search to find one fingerprint with a largest similarity value.

3. The method according to claim 1, wherein finding a desired set of the selected fingerprints that minimizes the query error subject to a storage constraint further includes:
finding a single-source shortest path in a Directed Acyclic Graph (DAG), wherein all nodes are topologically ordered with each node representing one fingerprint in an original video sequence.

4. The method according to claim 1, wherein generating a matching result to be presented to the user further includes:
combining the matching result with additional information obtained from the fingerprint database to form a search report for the user.

5. The method according to claim 1, wherein:
provided that $F=\{f_i|0\le i\le n-1\}$ denotes the at least one fingerprint for the query video sequence, a query is defined by:

$$q(f_i, X) = \begin{cases} x_O & x_O = \underset{x_l}{\mathrm{argmax}}\{sim(f_i, f_{x_l}) \mid f_{x_l} \in X\}, \text{ and } sim(f_i, f_{x_O}) \ge TH_s \\ -1 & \text{otherwise} \end{cases},$$

wherein sine(•) is a similarity function with a real number between 0 and 1; $x_l$ is an index of the selected fingerprint in the original video sequence; m is a total number of selected fingerprints $X=\{f_{x_l}|x_0<x_1<\ldots<x_{m-1}, 0\le l\le m-1, m\le n\}$; n is a total number of frames in the query video sequence; and $TH_s$ is a preset threshold of meeting a similarity requirement.

6. The method according to claim 5, wherein:
when an output of the query is equal to $x_I$, a query result meets expectation, denoted by $x_E$; and
when an output of the query is not equal to $x_I$, the query error occurs, wherein:
when none of the selected fingerprints meets a minimum similarity requirement ($TH_s$), this type of error is represented by:

$$\varphi(f_i, f_{x_E}) = \begin{cases} 1 & sim(f_i, f_{x_E}) < TH_s \\ 0 & \text{otherwise} \end{cases};$$

and
when the output of the query is not $x_E$, but the similarity between the query fingerprint and its closest selected fingerprint is equal to or is larger than the preset threshold $TH_s$, this type of error is represented by:

$$\xi(f_i, f_{x_E}) = \begin{cases} 1 & sim(f_i, f_{x_E}) \ge TH_s, \exists f_{x_j} \in X, sim(f_i, f_{x_E}) < sim(f_i, f_{x_j}) \\ 0 & \text{otherwise} \end{cases}.$$

7. The method according to claim 1, wherein:
provided that any selected fingerprint in the fingerprint database has h references in the inverted file indexing table, total space for storing the inverted index table is defined by:

$$S(f_i,X)=c \cdot h \cdot m=\Sigma_{i=0}^{m-1}C,$$

wherein m is a total number of selected fingerprints in the fingerprint database; c is a constant factor; and C=c·h is a constant number representing the space required to keep exactly one reference of the fingerprint.

8. A video retrieval system, comprising at least one processor being configured for:
   storing video sequences and metadata of the video sequences in a memory;
   extracting by a predetermined feature extracting algorithm a plurality of selected fingerprints from a plurality of video frames representing features having characteristic information specific to the plurality of video frames;
   storing the plurality of extracted selected fingerprints in the memory;
   based on the fingerprints stored in the fingerprint database, building a plurality of indices to generate an inverted file indexing table of the fingerprints, wherein each of the plurality of fingerprint is divided into a plurality of words, and vertical and horizontal dimensions of the inverted file indexing table represent respectively possible values of a word and a position of the word in the fingerprint;
   extracting by the predetermined feature extracting algorithm at least one query fingerprint representing at least one query frame from the received query video sequence when a query video sequence is submitted by a user;
   calculating similarity between the query fingerprint and selected fingerprints;
   determining a matching fingerprint in the selected fingerprints by applying a fast dynamic programming algorithm;
   based on the matching fingerprint, generating a matching result to be presented to the user;
   analyzing a query error caused by using a limited number of the selected fingerprints to approximate an original fingerprint set;
   based on the inverted file indexing table, matching the fingerprint of the query video with the fingerprints stored in the fingerprint database by using a voting-based matching approach; and
   finding a desired set of the selected fingerprints that minimizes the query error subject to a storage constraint.

9. The system according to claim 8, wherein the at least one processor is further configured for:
   counting a total number of matched words for each of the fingerprints that have at least one matched word with the query fingerprint;
   identifying a matching fingerprint with a most number of matched words from the fingerprints as the matching fingerprint; and
   when multiple fingerprints have a same number of the matched words, performing a linear search to find one fingerprint with a largest similarity value.

10. The system according to claim 8, wherein the at least one processor is further configured for:
    finding a single-source shortest path in a Directed Acyclic Graph (DAG), wherein all nodes are topologically ordered with each node representing one fingerprint in an original video sequence.

11. The system according to claim 8, wherein the at least one processor is further configured for:
    combining the matching result with additional information obtained from the fingerprint database to form a search report for the user.

12. The system according to claim 8, wherein the at least one processor is further configured for:
    provided that $F=\{f_i|0 \leq i \leq n-1\}$ denotes the at least one fingerprint for the query video sequence, defining a query by:

$$q(f_i, X) = \begin{cases} x_O & x_O = \underset{x_l}{\mathrm{argmax}}\{sim(f_i, f_{x_l}) \mid f_{x_l} \in X\}, \text{ and } sim(f_i, f_{x_O}) \geq TH_s \\ -1 & \text{otherwise} \end{cases},$$

wherein sin(•) is a similarity function with a real number between 0 and 1; $x_l$ is an index of the selected fingerprint in the original video sequence; m is a total number of selected fingerprints $X=\{f_{x_l}|x_0<x_1< \ldots <x_{m-1}, 0 \leq l \leq m-1, m \leq n\}$; n is a total number f frames in the query video sequence; and $TH_s$ is a preset threshold of meeting a similarity requirement.

13. The system according to claim 12, wherein the at least one processor is further configured for:
    when an output of the query is equal to $x_I$, having a query result meeting expectation, denoted by $x_E$; and
    when an output of the query is not equal to $x_I$, having the query error occurring, wherein:
    when none of the selected fingerprints meets a minimum similarity requirement ($TH_s$), this type of error is represented by:

$$\varphi(f_i, f_{x_E}) = \begin{cases} 1 & sim(f_i, f_{x_E}) < TH_s \\ 0 & \text{otherwise} \end{cases};$$

and
when the output of the query is not $x_E$, but the similarity between the query fingerprint and its closest selected fingerprint is equal to or is larger than the preset threshold $TH_s$, this type of error is represented by:

$$\xi(f_i, f_{x_E}) = \begin{cases} 1 & sim(f_i, f_{x_E}) \geq TH_s, \exists f_{x_j} \in X, sim(f_i, f_{x_E}) < sim(f_i, f_{x_j}) \\ 0 & \text{otherwise} \end{cases}.$$

14. The system according to claim 8, wherein the at least one processor is further configured for:
    provided that any selected fingerprint in the fingerprint database has h references in the inverted file indexing table, defining total space for storing the inverted index table by:

$$S(f_i,X)=c \cdot h \cdot m=\Sigma_{i=0}^{m-1}C,$$

wherein m is a total number of selected fingerprints in the fingerprint database; c is a constant factor; and C=c·h is a constant number representing the space required to keep exactly one reference of a fingerprint.

* * * * *